United States Patent [19]

Creps et al.

[11] 4,428,838

[45] Jan. 31, 1984

[54] TUBULAR FILTER STRUCTURE

[75] Inventors: John L. Creps, Rudolph; Timothy J. Hainen; Stephen N. McEwen, both of Bowling Green, all of Ohio

[73] Assignee: Henry Filters, Inc., Bowling Green, Ohio

[21] Appl. No.: 449,512

[22] Filed: Dec. 13, 1982

[51] Int. Cl.³ .............................................. B01D 29/32
[52] U.S. Cl. .............................. 210/323.2; 210/497.01
[58] Field of Search .................... 210/232, 325, 323.1, 210/323.2, 484, 237, 497.01, 333.01; 55/374, 378, 379

[56] References Cited

U.S. PATENT DOCUMENTS

| | | | |
|---|---|---|---|
| 401,930 | 4/1889 | Cooper et al. | 210/497.01 |
| 979,481 | 12/1910 | Hannold | 210/445 |
| 1,706,400 | 3/1929 | Diamond | 210/323.2 |
| 1,716,040 | 6/1929 | Genter | 210/333.1 |
| 1,812,042 | 6/1931 | Genter | 210/325 |
| 2,059,461 | 11/1936 | Johnson | 210/237 |
| 2,399,887 | 5/1946 | Olson | 210/237 |
| 2,440,487 | 4/1948 | Rayburn | 210/323.2 |
| 2,534,286 | 12/1950 | Maitzen | 210/237 |
| 2,545,374 | 3/1951 | Nugent | 210/323.2 |
| 2,767,851 | 10/1956 | Muller | 210/323.2 |
| 3,394,815 | 7/1968 | Harms et al. | 210/323.2 |
| 3,438,502 | 4/1969 | Schmidt, Jr. et al. | 210/232 |
| 3,491,886 | 1/1970 | Glos et al. | 210/232 |
| 3,503,516 | 3/1970 | Harms et al. | 210/323.2 |
| 3,720,322 | 3/1973 | Harms | 210/238 |
| 3,935,105 | 1/1976 | McEwen | 210/138 |
| 4,139,472 | 2/1979 | Simonson | 210/232.2 |
| 4,237,011 | 12/1980 | Acosta | 210/237 |

Primary Examiner—Charles N. Hart
Assistant Examiner—John W. Czaja
Attorney, Agent, or Firm—Hugh Adam Kirk

[57] ABSTRACT

An easily removable tubular filter assembly, such as from a cylindrical array of parallel filter tubes arranged between two spaced parallel circular plates, which array is immersible in a liquid to be filtered. Each filter tube comprises a central open-ended perforated rigid tube with flanged tubular bushings for each end, and a fabric tubular sock which surrounds the perforated tube and tucks in the ends of the tube around the outer flanges of said bushings. A flanged tubular ferrule snugly fits in the bushing at one end of the fabric-covered tube to hold the tucked-in sock in place and seal its flange into an aperture in a wall of a suction chamber which may comprise one of the parallel circular plates of the array assembly. The other end of each filter tube is closed by a plug which snugly fits into the other end bushing and holds the other tucked-in end of the sock in place, as well as supports that end of the filter tube in an aperture in the other spaced circular plate, identical with that plate forming the wall of the suction chamber. The outer end of this plug provides a seat for a compression spring which is compressed by a removable plate bolted to the adjacent apertured plate, which compressed spring urges all the filter tubes into sealing contact with the apertures in the suction chamber. Thus, by removing the outer bolted plate, which may cover, preferably not more than half of the apertures and filter tube ends, enables easy axial removal of its associated filter tubes from the array for replacement without further disassembly of the array.

12 Claims, 4 Drawing Figures

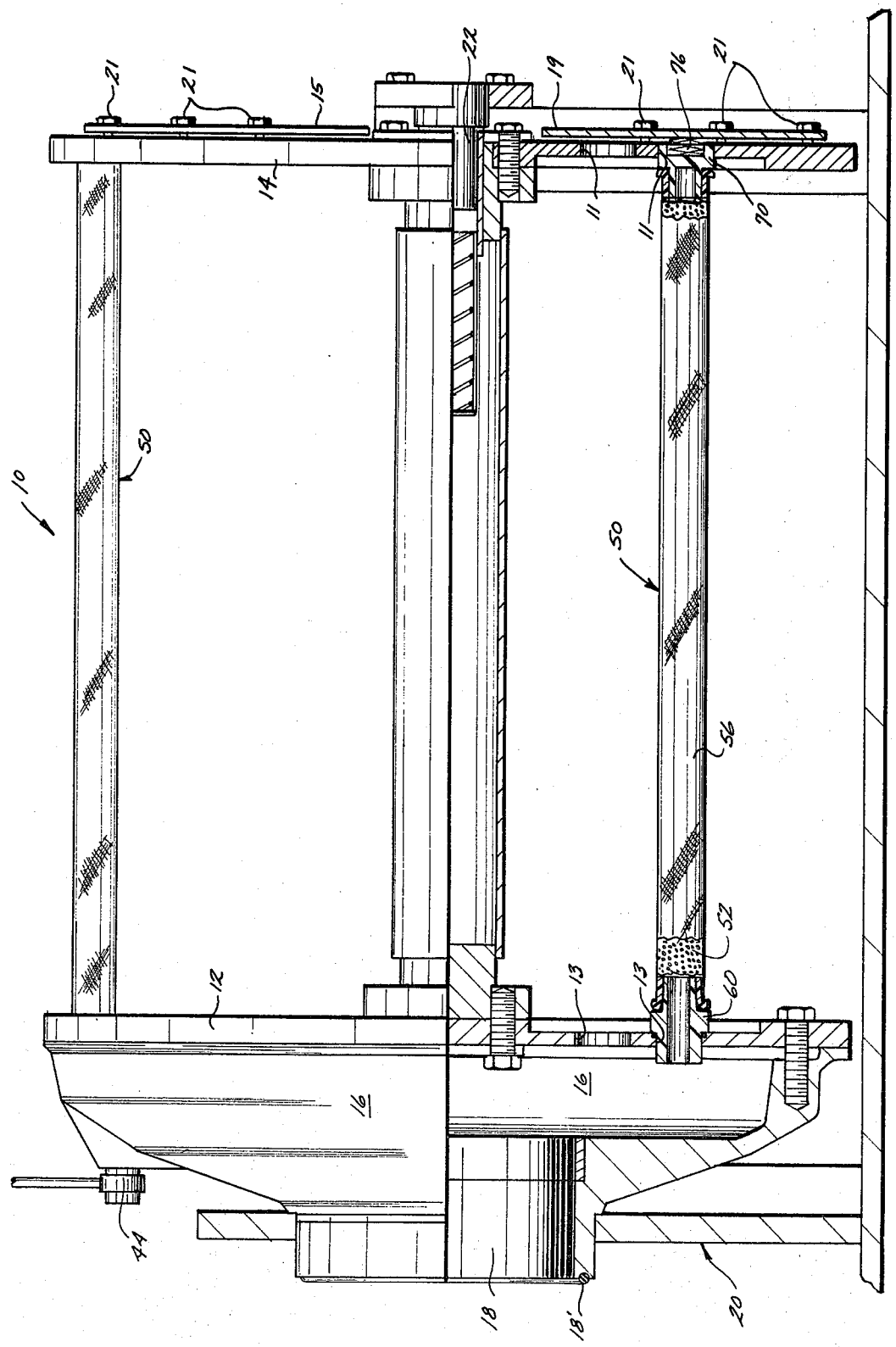
FIG. II

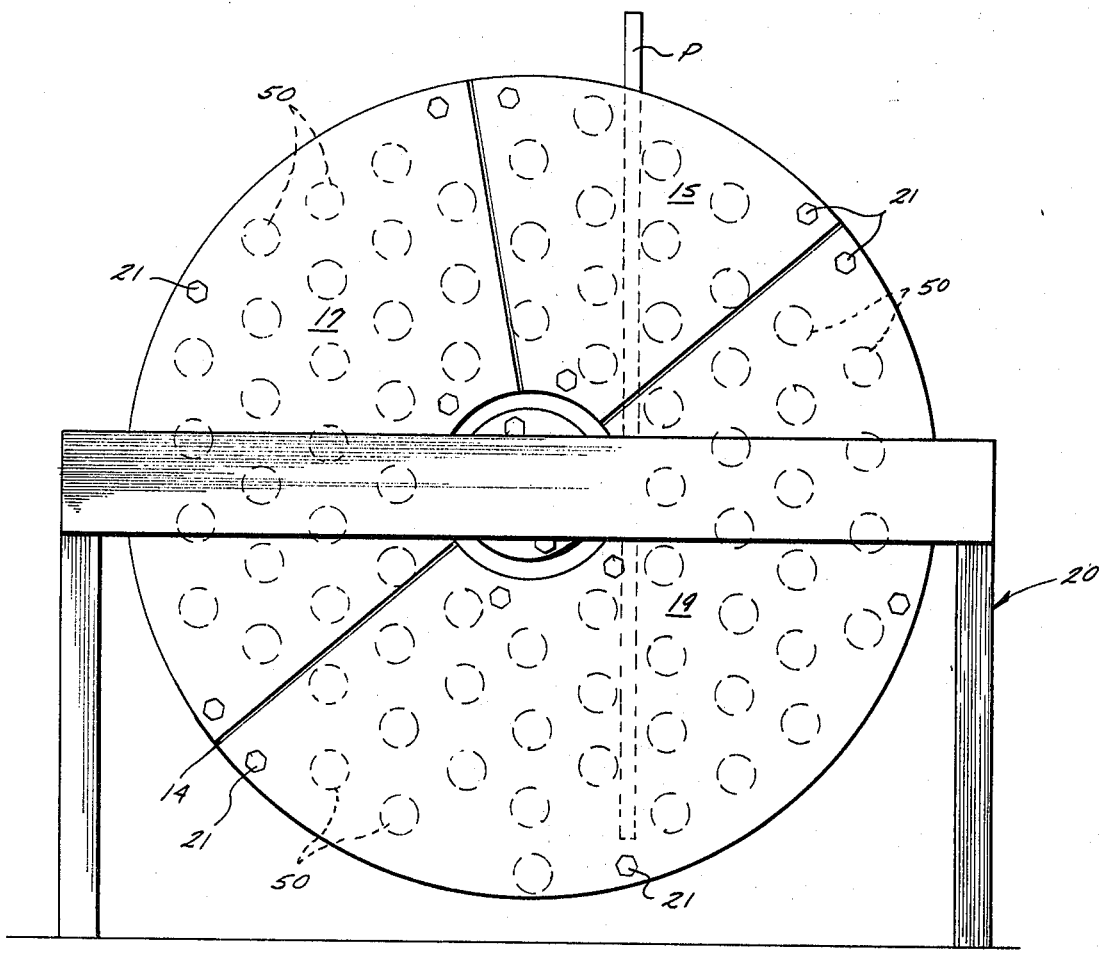
FIG. III

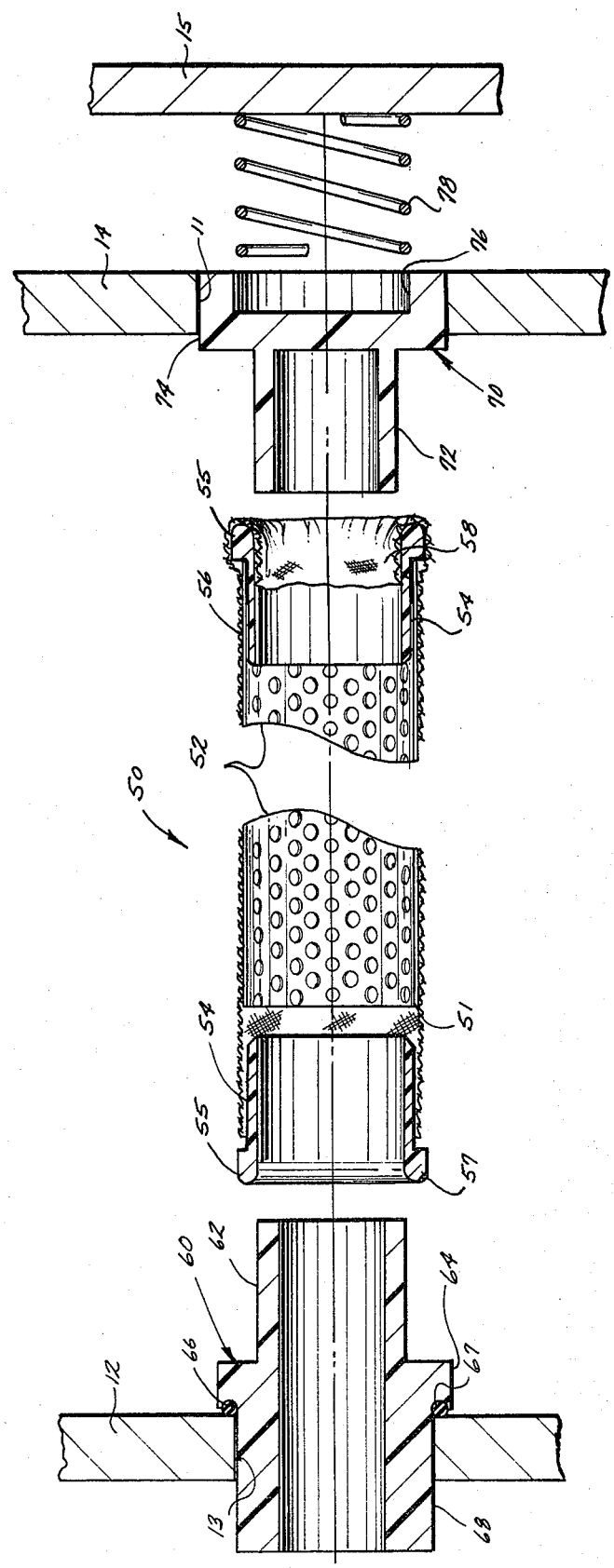
FIG. IV

TUBULAR FILTER STRUCTURE

BACKGROUND OF THE INVENTION

This is an improvement in the filter tubes disclosed in Harms U.S. Pat. No. 3,503,516 issued Mar. 31, 1970 and Harms U.S. Pat. No. 3,720,322 issued Mar. 13, 1973, and adapting such filter tubes for an assembled array, such as disclosed in McEwen U.S. Pat. No. 3,935,105 issued Jan. 27, 1976.

Although it is well known to have filter tubes with perforated inner tubes, fabric socks, and axial compression springs to press them into engagement with an aperture in a suction duct or chamber, there is no known filter tubes having the specific parts and structure invented by applicants for such easy replacement in a tubular filter array of the type disclosed in said above mentioned McEwen U.S. Pat. No. 3,935,105.

SUMMARY OF THE INVENTION

The improved tubular filter structure of this invention is particularly adapted for arrays of parallel tubular filters clamped between two spaced parallel apertured plates, the apertures in each of which plates support the ends of the filter tubes. One apertured plate comprises the wall of a suction or reduced pressure chamber and requires a fluid seal between that end of each filter tube and the wall plate. The other end of each filter tube is supported by the apertures in the other parallel apertured plate. An additional two or more sector-shaped plates bolted to this supporting apertured plate, compress springs at the end of each filter tube for axially urging each filter tube into sealing contact with the apertures in the wall of the suction chamber. Thus, by removing a bolted plate from the supporting apertured plate, any one of the filters held by that unbolted plate can easily be axially removed from the array and replaced without further disassembly of the array or of the tubular filter.

In order to accomplish this easy replaceable function, each filter tube in the tubular filter array comprises a central rigid perforated tube such as of stainless steel, into the ends of which are placed outwardly flanged bushings to cover the sharp ends of the tube so that the longer surrounding tubular fabric sock or flexible filter media, such as of nylon, which is slipped over said tube can have its open ends tucked into the open ends of said tube inside each bushing without rupture of the turned-over edges of the sock on the sharp ends of the perforated metal tubes. Separate pieces are then plugged into each of these bushings for holding the sock in place. One end piece comprises a hollow ferrule with a central outwardly extending flange having an annular seat, preferably of semi-circular radial cross-section, for an O-ring which is urged against the periphery of the aperture in the suction chamber wall plate. The other outer tubular end of this ferrule fits inside the aperture in this wall for supporting that end of the filter tube. The other end of the filter tube is provided with a plug for fitting into the bushing and holding that tucked-in end of the fabric sleeve in place, as well as having an outward flange for supporting that end of the filter tube in the aperture aligned with and corresponding to that one in the other parallel plate in such suction chamber. A depression is provided in the outer surface of this plug for seating a helical compression spring which is compressed by the plate bolted to the adjacent support plate. This spring urges its filter tube axially so that its O-ring in the seat of the flange of the ferrule at the other end of the tubular filter will form a fluid-tight seal with the periphery of the aperture in the suction chamber and maintain that seal until the filter tube is removed by removal of the bolted plate at the opposite end of the tube.

OBJECTS AND ADVANTAGES

It is an object of this invention to produce an efficient, effective, economic and simple tubular filter.

Another object is to produce an array of parallel filter tubes which can be easily and quickly removed and replaced in such array without disassembling the whole array.

BRIEF DESCRIPTION OF THE VIEWS

The above mentioned and other features, objects and advantages, and a manner of attaining them are described more specifically below by reference to an embodiment of this invention shown in the accompanying drawings, wherein:

FIG. 1 is a perspective view of a tubular filter according to this invention comprising a cylindrical array of parallel filter tubes mounted in a frame, which frame is removed by a hoist from a tank in which liquid to be filtered is placed, with parts of the tank being broken away;

FIG. II is an enlarged partial vertical sectional view of the cylindrical array of filter tubes shown in FIG. I with most of the filter tubes removed and parts of its support frame broken away;

FIG. III is a right end view of the drum array of filter tubes shown in FIG. II, showing three different shapes of plates which may be employed for holding the filter tubes in place; and FIG. IV is an enlarged partly-exploded longitudinal sectional view of one filter tube assembly according to a preferred embodiment of this invention with the central part of the filter tube being broken away.

DETAILED DESCRIPTION OF PREFERRED EMBODIMENT

The Array

Figure 1:
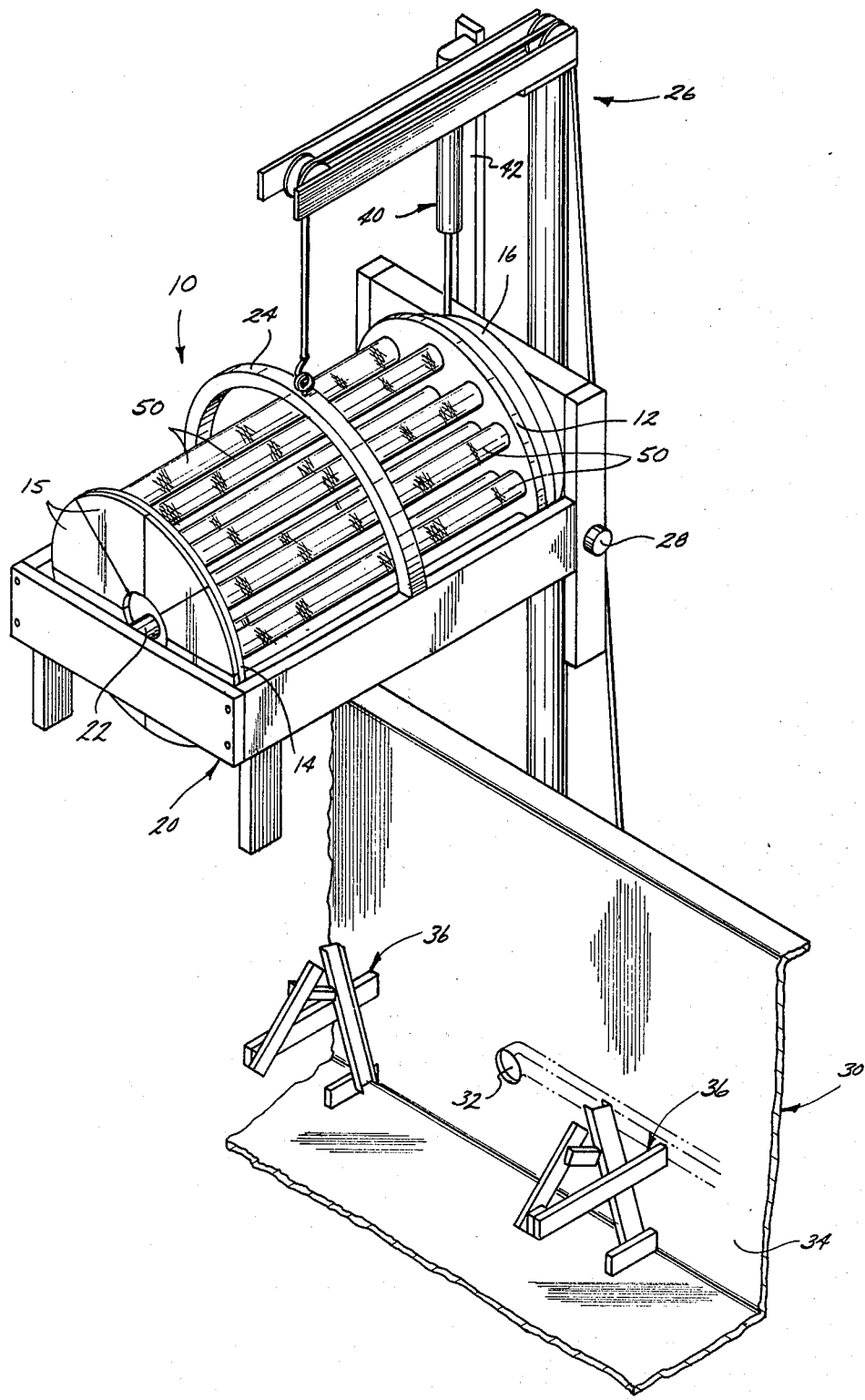

Referring first to FIGS. I and II there is shown a cylindrical array 10 of a plurality of parallel filter tube elements 50 supported between two parallel apertured plates 12 and 14 axially spaced at a distance slightly less than the length of each filter element 50 so that opposite ends of each filter tube element are supported in aligned apertures in said plates 12 and 14. One of these plates 12 comprises a wall of a suction chamber 16 having an outlet 18 journalled in one end of a supporting frame 20, which frame also journals and supports the other end plate 14 by a stub shaft 22. This frame herein has a bail 24 by which it may be lifted by a crane 26 and placed inside or removed from a settling tank 30, the whole of which frame may be urged against a suction outlet 32 in a wall 34 of the tank 30 by means of a pair of toggle mechanisms 26 which engage trunnions 28 on the frame 20. The suction outlet 32 is thus sealingly connected to the outlet 18 of the suction chamber 16 of the filter tube array 10 by means of an O-ring 18'.

As shown in FIGS. II and III, the right end of the array shown in FIG. II is provided with a plurality of clamping plates 15, 17 and 19 attached by bolts 21 to the supporting end plate 14, which plates cover the apertures in the plate 14 and also urge each of the filter tubes 50 into sealing engagement with the apertures in the suction wall plate 12. It is to be understood that these plates 15, 17 and 19 can be all of the same shape, that is there may be provided two half plates 19, or three 120° sector plates 17, or six 60° sector plates 15, as desired, so that the plates may be easily removed without even taking the array out of its supporting frame 20. Attention is also called to the fact that the alignment of the filter tubes 50 in the array 10 is such that cleaning boards or plates P may be inserted between them in the event they become bridged with particles between the filter tubes.

Furthermore, in this embodiment, there may be provided an oscillating cylinder motor means 40 supported on the frame 20 by bracket 42 and connected to a crank pin 44 on the outside of the suction chamber 16 so that the array may be oscillated at intervals for knocking off the particles that collect on the outside of the filter tube elements 50.

The Tubular Filter

Referring now to FIG. IV there is disclosed one of the plurality of filter tube elements 50 of this invention showing the separate parts thereof. The base support or inside of each element comprises a perforated rigid cylinder 52, such as of stainless steel, the outer edges of which may be quite rough and thus are covered by a pair of bushings 54 having outwardly extending flanges 55 which cover the jagged outer edges ends 51 of the perforated solid cylindrical tube 52. Then the filter medium of cloth or woven fabric, such as nylon 56, may be fitted over this tube 52 with its bushings 54 in each end thereof, so that the round outer smooth rounded surfaces 57 of the bushings 54 will not cut or wear the tucked-in ends 58 of the filter sleeve.

In order to hold these sleeves in place, there is provided at one end a flanged ferrule 60 being hollow and having a tube insertable portion 62 that snugly fits inside the bushing 54 and frictionally holds the tucked-in fabric 58 in place in the bushing 54. Centrally of this ferrule is an outwardly extending flange 64 which has on its outer annular face a groove 66, semicircular in radial cross-section, into which seats an O-ring 67 so that it can seal around the outside of the aperture 13 in the wall plate 12 of the suction chamber 16. The outer cylindrical tubular portion 68 of the ferrule 60 slipfits into the aperture 13 in the plate 12 to support that end of the filter tube.

The opposite end of the filter tube element assembly 50 is provided with a plug 70 which also has a tube insertable portion 72, similar to portion 62 of the ferrule 60, for holding the tucked-in end 58 of the fabric filter sleeve into the adjacent bushing 54. An outwardly extending flange portion 74 on this plug 70 slip-fits into the aperture 11 in the supporting plate 14 to support this other end of the filter tube. A recess 76 is provided in the outer end of this plug 70 into which a helical compression spring 78 seats and is compressed by the plate 15, 17 or 19 to urge the filter tube element 50 into a sealing connection with the suction chamber 16 by pressing the O-ring 67 against the peripheral edge of the aperture 13.

It is to be understood that the fitting of the bushings 54 into the open ends of the tube 52, and of the cylindrical sleeve portions 62 and 72 inside of the bushings 54 to hold the fabric filter 56 tucked-in ends 58 in place, are frictional and snug, but can be removed and inserted easily by hand.

Although the bushings 54, ferrule 60, and plug 70 herein are shown to be made of plastic, and the perforated tube 52 of metal, it is to be understood that the composition of these parts may be changed without departing from the scope of this invention, provided they have the necessary physical properties for carrying out the functions for which they were designed.

While there is described above the principles of this invention in connection with specific apparatus, it is to be clearly understood that this description is made only by way of example and not as a limitation to the scope of this invention.

We claim:

1. A filter comprising a container for liquid to be filtered and a frame submersible in said liquid in said container, said frame comprising:
   (A) a suction chamber having an apertured wall plate,
   (B) a parallel apertured plate, the apertures in said plates being axially aligned,
   (C) a removable cover plate adjustably and parallelly attached to said parallel plate,
   (D) means to support said parallel plate at a fixed distance parallel to said wall plate, and
   (E) a plurality of filter tubes extending between said aligned apertures in said wall plate and said parallel plate, each said filter tube comprising:
      (1) perforated rigid tube having opposite open ends,
      (2) bushings insertable in the ends of said tube, each having a rounded outer flange extending over and abutting the ends of said tube,
      (3) a tubular fabric sock open at both ends surrounding and longer than said tube so that its ends are tucked around the rounded flanges and into the open ends of said bushings,
      (4) a ferrule having a central tubular aperture and a circumferential flange intermediate its ends, one end of said ferrule snugly fitting into the bushing at one end of said tube to hold the tucked-in end of said sock therein, and the other end of said ferrule fitting into an aperture in said wall plate,
      (5) a seal between said circumferential flange and the edge of the aperture in said wall plate to seal said filter tube to said suction chamber,
      (6) a plug fitting into the bushing at the other end of said tube to hold the other tucked-in end of said sock therein, and having a recess at its outer end, the outer wall of said recess being supported in an aperture in said parallel plate, and
      (7) a compression spring seated in said recess and pressed by said cover plate to urge said seal into sealing engagement with said wall plate.

2. A filter according to claim 1 wherein said plurality of filter tubes are arranged in a cylindrical shape.

3. A filter according to claim 2 wherein said cover plate is formed from of least two sector plates.

4. A filter according to claim 1 wherein said perforated rigid tubes are composed of stainless steel.

5. A filter according to claim 1 wherein said fabric sock is composed of nylon.

6. A filter according to claim 1 wherein said ferrule is composed of a durable plastic.

7. A filter according to claim 1 wherein said seal comprises an O-ring.

8. A filter according to claim 1 wherein said plug comprises plastic.

9. A filter according to claim 1 wherein said compression spring is a helical spring.

10. A filter according to claim 1 wherein said ferrules and said plugs have outer cylindrical surfaces slip-fitting into the apertures of said parallel apertured plates.

11. A filter according to claim 1 wherein said cover plate is bolted to said parallel plate.

12. A filter according to claim 7 wherein said circumferential flange on said ferrule has a groove seat for said O-ring, which groove seat is semicircular in radial cross-section.

* * * * *

UNITED STATES PATENT AND TRADEMARK OFFICE
CERTIFICATE OF CORRECTION

PATENT NO. : 4,428,838
DATED : January 31, 1984
INVENTOR(S) : John L. Creps et al It is certified that error appears in the above–identified patent and that said Letters Patent are hereby corrected as shown below:

Column 2, line 60, change reference character "26" to - - 36 - - .

Signed and Sealed this

Twenty-fourth Day of April 1984

[SEAL]

Attest:

GERALD J. MOSSINGHOFF

Attesting Officer

Commissioner of Patents and Trademarks